(12) United States Patent
Wittwer et al.

(10) Patent No.: US 6,776,016 B1
(45) Date of Patent: Aug. 17, 2004

(54) DEVICE FOR STARTING A MOTOR VEHICLE MOTOR, USING AN ELECTRONIC KEY

(75) Inventors: Reinhard Wittwer, Heiligenhaus (DE); Günter Barrenberg, Velbert (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 0 days.

(21) Appl. No.: 10/069,247

(22) PCT Filed: Aug. 10, 2000

(86) PCT No.: PCT/EP00/07769

§ 371 (c)(1),
(2), (4) Date: May 9, 2002

(87) PCT Pub. No.: WO01/14179

PCT Pub. Date: Mar. 1, 2001

(30) Foreign Application Priority Data

Aug. 21, 1999 (DE) ......................... 199 39 733

(51) Int. Cl.⁷ ............................................. B60R 25/02
(52) U.S. Cl. ............................. 70/252; 70/361; 70/387; 70/389
(58) Field of Search ................... 70/360, 361, 387–390, 70/252, 278.2, 423, 427, 455

(56) References Cited

U.S. PATENT DOCUMENTS

| | | | | |
|---|---|---|---|---|
| 533,369 A | * | 1/1895 | McKee et al. | |
| 1,743,331 A | * | 1/1930 | Ellison | |
| 2,395,762 A | * | 2/1946 | Rober | |
| 4,516,415 A | * | 5/1985 | Kobayashi et al. | 70/252 |
| 4,601,184 A | * | 7/1986 | Doinel | 70/360 |
| 5,254,996 A | | 10/1993 | Claar et al. | 341/176 |
| 6,442,985 B1 | * | 9/2002 | Watanuki et al. | 70/186 |
| 6,539,762 B1 | * | 4/2003 | Wittwer | 70/423 |

FOREIGN PATENT DOCUMENTS

| | | | | |
|---|---|---|---|---|
| DE | 2429327 | * | 1/1976 | ................. 70/361 |
| DE | 3306863 | | 9/1984 | |
| DE | 196 41 898 C1 | | 11/1997 | |
| DE | 197 47 732 A1 | | 5/1999 | |
| IT | 428161 | * | 12/1947 | ................. 70/360 |
| WO | WO00/29267 | | 5/2000 | |

* cited by examiner

*Primary Examiner*—Lloyd A. Gall
(74) *Attorney, Agent, or Firm*—Friedrich Kueffner (57) ABSTRACT

The invention relates to a device for starting a motor vehicle motor. According to the invention, a slot is (11) used for inserting (59) the key (50) which is usually closed by a spring-loaded cover (14). The key (50) is displaced in the slot (11) into various key positions (20.1), in order to control different functions of the motor or other ancillary devices in the vehicle. In order to ensure a compact construction which is easy to use, the inventive device prevents the key (50) from turning in the slot (11) and the key (50) is displaced into at least three operating positions (20.1) for the control functions which are axially staggered. After being inserted for a first operating distance (51), the key takes up an initial position (20.1), in which it is secured in the slot (11) in a force-fit. In a subsequent second intermediate position, the key (50) is secured in a positive fit which can be locked automatically. This prevents the manual withdrawal (57) of the key (50). In order to remove the key (50), the latter is axially pushed into a third final position, in which the lock on the operating position can be released. During its course of operation, the key (50) is axially spring-tensioned (41) in the direction of the retaining position The operating position of the key (50) determines the different vehicle functions.

20 Claims, 7 Drawing Sheets

DEVICE FOR STARTING A MOTOR VEHICLE MOTOR, USING AN ELECTRONIC KEY

BACKGROUND OF THE INVENTION

The invention relates to a device for starting a motor vehicle with an electronic key. Such devices are conventionally referred to as "electronic ignition lock" or "ignition and steering column lock". Conventionally, by means of an electronic key, the access to the vehicle is locked and unlocked. For this purpose suitable door locks are provided. When employing these keys in the device of interest in this connection, the key is inserted into a receptacle provided in the motor vehicle. In certain situations a cover provided thereat is pushed out of the way. For controlling different functions within the motor vehicle the inserted key is moved into various key positions within the receptacle.

In the known device of this kind (DE 44 34 655 A1), the different functions are selected by means of corresponding rotational positions of the electronic key in the receptacle. For this purpose, the receptacle is comprised of a rotor and a stator and different sensors on the stator which must determine the different rotational positions of the rotor. This is complex with regard to construction and requires a large space. In order to exert the required torque for adjusting the key manually, the key must project sufficiently far out of the opening of the receptacle. A key which projects far however increases the risk of injury in a crash situation of the vehicle. In addition or as an alternative to the rotating movement, a transitory movement of the key may also be performed.

In a device of a different kind (DE 198 14 964 A1) the signal for authorizing driving is generated by detection of a fingerprint of the authorized person. In this connection, an authorizing element in the form of a check card is used which is inserted into a slot adjacent to a toggle switch or a rotary switch. The rotary switch or the toggle switch have sensors for the fingerprint and can be pressure-actuated or rotated between different switch positions. Accordingly, different functions of the motor are controlled. In this case, in addition to the insertion movement of the authorizing element, a rotation or push movement of a switch as well as the application of a fingerprint at the location having the sensor are required. This complex actuation is cumbersome.

Finally, it is known in regard to a starter switch of a motor vehicle (DE 195 04 991 C1) to provide a shaft in a rotary handle for complete insertion of an identification card. This insertion is possible only in a first position of the rotary handle. Starting from this position, the rotary handle with inserted card can then be moved into different further rotational positions which control different functions of the motor. In this case, aside from the insertion movements, rotational movements of the rotary handle are also required.

Moreover, from DE 33 06 863 a device for starting a motor of a motor vehicle by means of an electronic key is known. The electronic key is longitudinally movable between several axially staggered stroke positions, wherein the electrical contacts, in cooperation with a sending-receiving unit, activate different functions in the individual stroke positions. The electronic key is secured in the stroke positions by snap-in locking action or by a manually pivotable locking lever. A disadvantage is that for the sequentially occurring working steps a different stroke position is required, respectively. Moreover, for starting the motor with this device, after insertion of the electronic key up to the end position, the electronic key must be held under pressure in the end position until the motor runs. This manipulation is somewhat cumbersome. The correlation of a working step with a stroke position of the electronic key also leads to this device having a correspondingly large size.

SUMMARY OF THE INVENTION

It is an object of the invention to provide a device of the kind mentioned in the preamble of claim 1 that is reliable and can be actuated comfortably and avoids the aforementioned disadvantages. This is achieved according to the present invention by the features of the characterizing portion of claim 1 which have the following special meaning.

According to the invention, the key is not rotated for selecting a function. The key is moved instead upon insertion into the receptacle into three stroke positions which are axially staggered relative to one another. Of these positions, the second stroke position is decisive for the ignition of the motor. In this second stroke position, the key is almost completely inserted into the receptacle. In this second stroke position and in the third, deeper, stroke position, the important functions within the motor vehicle are carried out, for which purpose, as needed, further manual or pedal-type actuators may be used. The motor vehicle operator must not carry out actuations with the key in order to trigger the desired functions within the motor vehicle. The key remains instead substantially immersed in the receptacle so that in a crash situation no risk of injury is to be expected as in the situation with projecting key parts.

In its second stroke position, the key is fixed in the receptacle by a directional lock whose positive-locking securing means secure the key relative to an axial spring force. In order to be able to remove the key again, it is sufficient to tap against its end. This transfers the key into its third stroke position. The end of the key can be immersed to any random depth within the receptacle. In this third stroke position, the locking action can be released as needed. The key is then pushed back into its initial position by means of an axial restoring spring action acting indirectly or directly on it. Now only a non-positive connection of a snap-in lock is present. The key can again be removed manually. According to the invention, only axial movements of the electronic key are thus required between at least three stroke positions in order to control the motor or further auxiliary devices within the motor vehicle. This axial movement is oriented in the same direction as the insertion of the key into the receptacle of the motor vehicle. Accordingly, a very obvious manipulation of the key is provided with the device of the invention.

BRIEF DESCRIPTION OF THE DRAWING

Further measures and advantages of the invention result from the dependent claims, the following description, and the drawings. In the drawings, the invention is schematically illustrated with the aid of two embodiments, and each one has independent inventive importance. The first embodiment is illustrated in FIGS. 1 through 8 and the second embodiment in FIGS. 9 through 14. It is shown in:

DETAILED DESCRIPTION OF THE INVENTION

Figure 1:
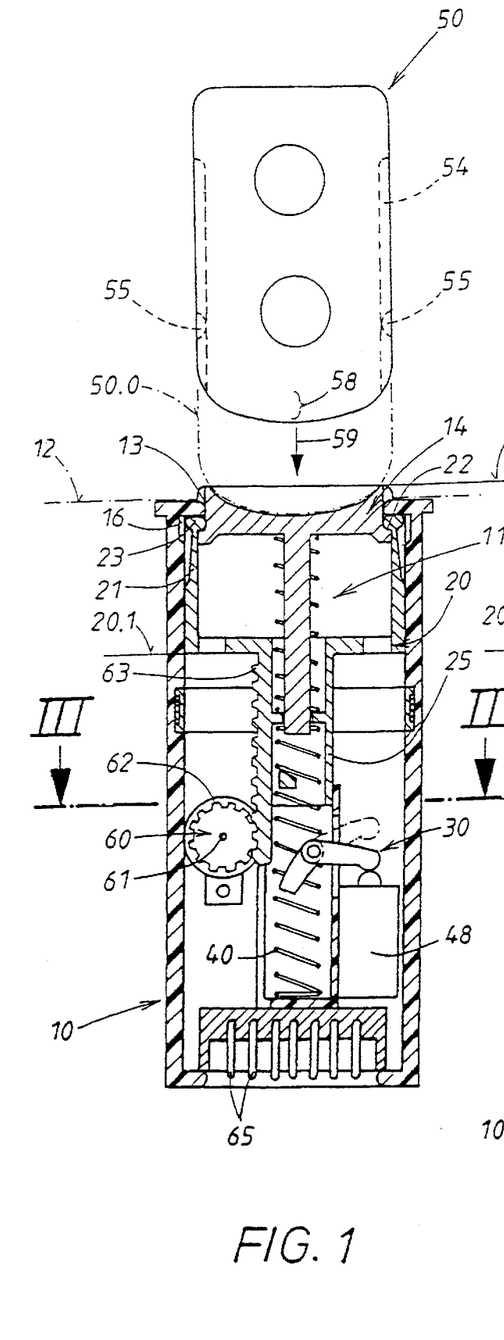
FIG. 1 an axial section of the device of the first embodiment, along the section line I—I of FIG. 3, wherein the components are in an initial position before insertion of a matching electronic key.
Figure 2:
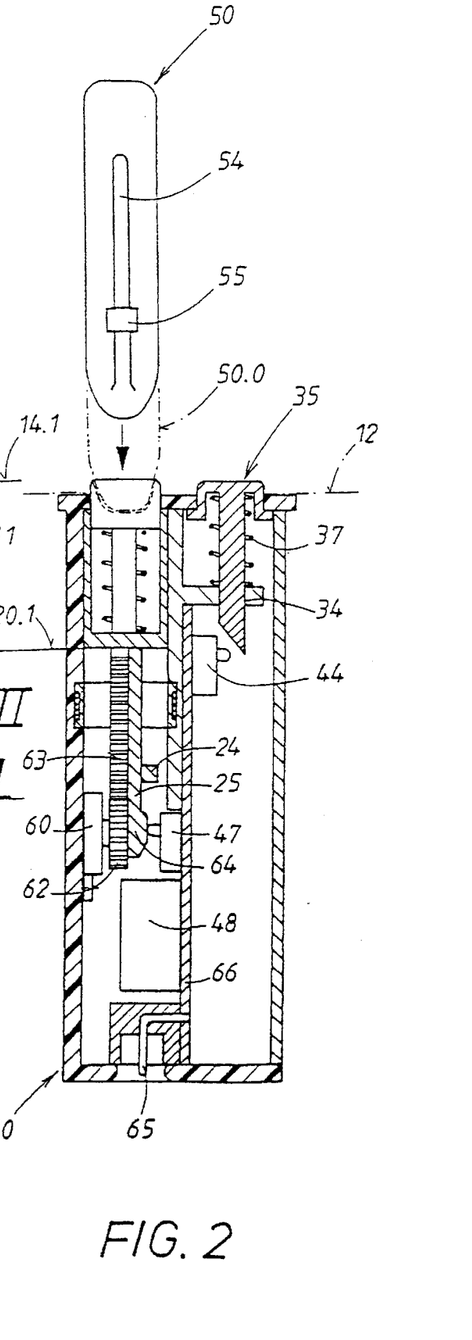
FIG. 2 the device of FIG. 1 in an axial section rotated at a right angle relative to FIG. 1, which section is indicated at II—II in FIG. 3, in the same position of the component.

In order for the key 50 to cooperate with the device, an insertion movement of the key 50 into the receptacle 11 is required which is illustrated by arrow 59 in FIGS. 1 and 2. In this connection, the key contacts the cover 14. This is the axial position 50.0 as indicated in a dash-dotted line in FIGS. 1 and 2. In this way, the key is immersed with its front piece 58 in a corresponding cutout of the cover 14 which is an additional part of the receptacle 11 arranged downstream in the housing 10. This position 50.0 of the key 50 will be referred to in the following for short as "contact position". Starting from this position, all further stroke positions of the key will be described with the aid of FIGS. 5 through 7.

Figure 5:
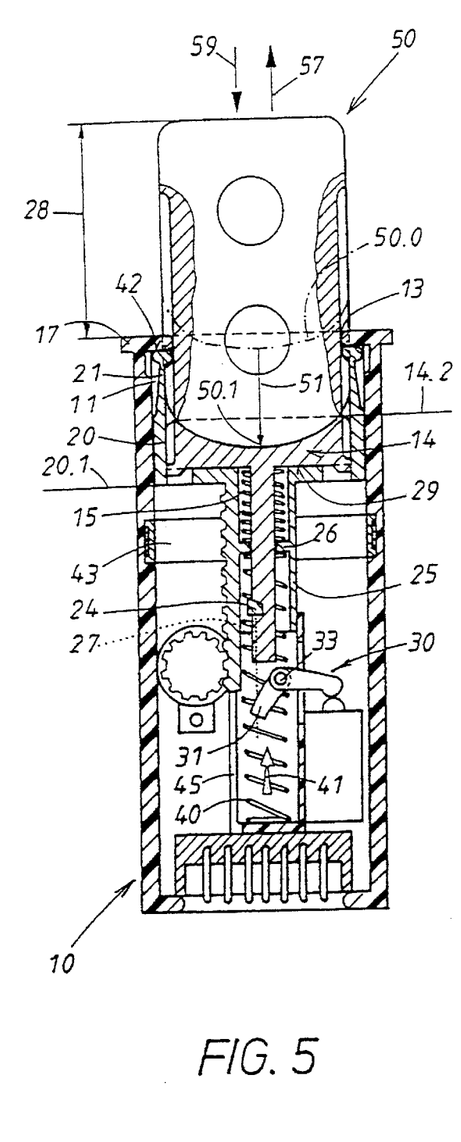
FIG. 5 in an illustration corresponding to FIG. 1 a first stroke position of the components which results after an initial insertion of the electronic key.

After an initial insertion movement 59 corresponding to a travel stroke 51 indicated in FIG. 5, the key reaches the first axial stroke position identified in FIG. 5 at 50.1. In this connection, as has already been mentioned, the cover 14 is pushed back and contacts its second end stop 29 in the interior of the slide 20. The opening 13 of the receptacle is exposed but is now closed by the inserted key 50. The cover 14 is in its insertion position 14.2. In this stroke position 50.1, the key 50 is secured non-positively in its receptacle 11 for which purpose securing elements 21, 22, 55 are provided whose configuration can be seen best with the aid of FIG. 1. The slide 20 is cup-shaped wherein the cup wall comprises, over portions thereof, a radially springy tongue 21 which forms a first securing element. This tongue 21 is initially a first component of the snap-in lock present between the key 50 and the slide 20. At the end of the tongue 21 a radial projection 22 is provided which represents a further securing element of the snap-in lock. This projection 22 may also provide the already mentioned stop function of the ejection position 14.1 of the cover 14. Upon insertion 59 of the key 50, the tongue 21 performs for a short period of time a radial spreading movement until the projection 22 seated on the tongue 21 engages non-positively a matching catch recess 55 on the key. This is illustrated in FIG. 5. The catch recess 55 is also a component of the aforementioned snap-in lock. In the following, this first stroke position 50.1 will be referred to for short as the "initial position" of the key. In this initial position 50.1 a non-positive securing action of the key in the receptacle 11 is present.

The aforementioned spreading movement of the tongue 21 upon insertion 59 of the key is possible even though the tongue 21 has a radial counter projection 23 at its side opposite the snap-active projection 22. In this area the housing 10 has a radial cutout 16 illustrated in FIG. 1 into which this counter projection 23 can radially deflect upon key insertion 29.

Figure 4:
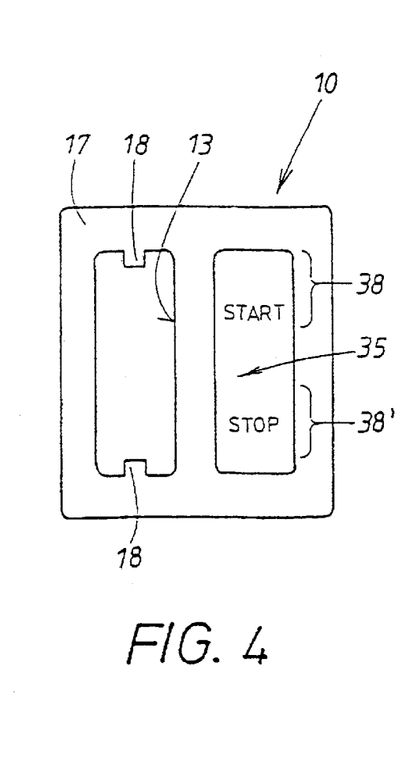
FIG. 4 an end view onto the device of FIGS. 1 through 3.

As illustrated in the plan view of FIG. 4, the opening 13 of the receptacle is surrounded by a cover 17 which has guide means 18 for the key 50. They are comprised of two oppositely arranged stays 18 on the cover 17. The correlated guide means 54 on the key are comprised of a longitudinal groove, as illustrated in FIGS. 1 and 2. These longitudinal grooves 54 on both sides provide a good axial insertion action 59 of the key 50, even when the outer surfaces of the key are not embodied axis-parallel for style reasons. By the way, the aforementioned securing-active catch recess 55 is arranged in the area of this longitudinal groove 54. The key 50, in its initial position 50.1 of FIG. 5, can be manually retracted by hand in the direction of arrow 57 of FIG. 5. Now the cover 14 returns into its ejection position 40.1 of FIG. 1. The key can be inserted also in a position rotated by 180°.

Figure 6:
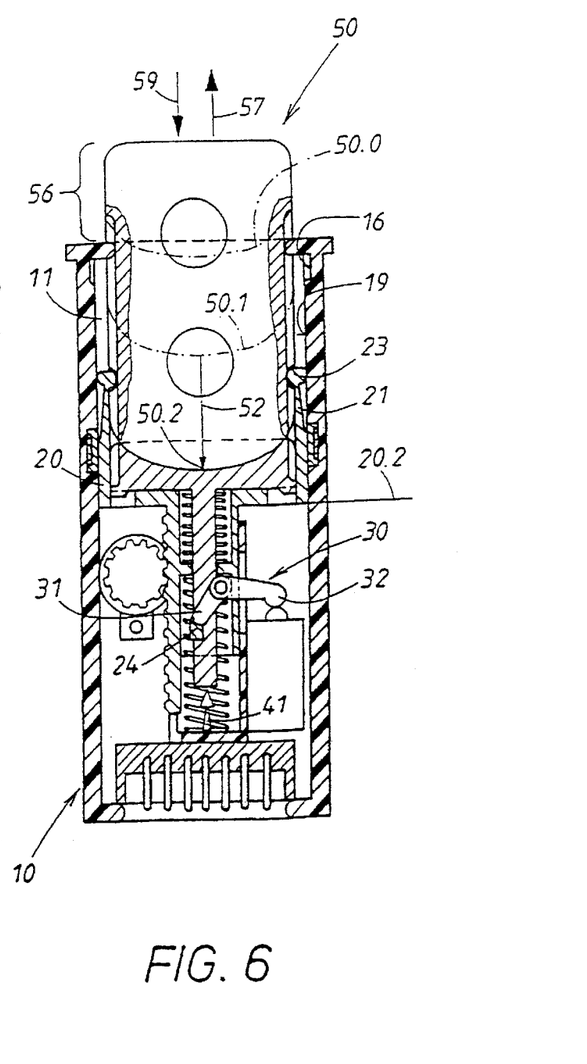
FIG. 6 a second stroke position of the components of the device illustrated in FIG. 1 resulting from a farther axial insertion of the key into the receptacle of FIG. 5.

The removal 57 of the key is however prevented when the key, starting from its initial position 50.1 of FIG. 5, has been moved by a further substantial travel stroke 52 into the second axial stroke position 50.2 illustrated in FIG. 6. Now the key 50 is even positive-lockingly secured in the receptacle 11. This positive-locking action is realized initially by the same securing elements 21, 22, 55 as in the case of the snap-in lock which previously provided the non-positive connection of the slide 20 and the key 50. The counter projection 23 provided on the springy tongue 21 of the slide 20 in this stroke position 50.2 will contact a radial support surface 19 in the housing 10 which is illustrated in FIG. 6. This support surface 19 is located below the radial recess 16 which was previously aligned therewith in the initial position 50.1. In the stroke position 50.2 the key 50 is thus positive-lockingly secured in the receptacle 14. Removal 57 in the direction of the arrow, also indicated in FIG. 6, is not possible. In the following, the second stroke position 50.2 of the key will be referred to for short as "center position".

The axial position of the slide 20 of FIG. 5 or 6 is achieved by a further insertion movement 59 of the key 50. In FIG. 5 the slide 20 is in the initial position identified at 20.1 which is the outer position of the slide in the housing 10. This initial position 20.1 is by the way also present in FIG. 1 or FIG. 2 where the key 50 has been removed completely or contacts 50.0 the cover 14. The reached stroke position 50.2 of the key 50 is initially secured because the slide 20, in which the key 50 is received, is locked in the corresponding axial position 20.2. For this purpose, a springy pawl 30 in the form of a latch is provided which has a locking arm 31 and a control arm 32 fixedly connected thereto. The latch 30 is stationarily but pivotably supported at 33 in the housing 10 and projects with its locking arm 31 into the movement path of a shoulder 24 which is also moved upon axial movements of the slide 20. In this embodiment, the shoulder 24 is provided on a cam which is a component of an axial projection 25, shown in FIG. 5, of the slide 20. Upon movement of the slide 20 along the travel path 52, the axial projection 25 penetrates in a telescoping way into a sleeve 45 fixed on the housing.

The housing sleeve 45 and the axial projection 25 serve by the way also for receiving a strong restoring spring 40 which has the tendency to secure the slide 20 in its initial position 20.1. For this purpose, it is expedient to embody also the axial projection 25 on the slide 20 of a tubular configuration, and the axial projection has an inner collar 26 on which the upper end of the restoring spring 40 is supported. The upper area of this tubular axial projection 25, in turn, can serve as a receptacle for the already described cover pressure spring 15 which, in comparison, is much softer. The restoring spring 40 exerts onto the slide 20 a restoring force which is illustrated in FIG. 5 by arrow 41. In this way, the slide 20 is forced against the end stop 42 fixed on the housing which in this embodiment is formed by the inner surface of the described cover 17. This stop 42 determines the initial position 20.1 of the slide 20. The cam with the shoulder 24 is still axially above the pawl 30 in the initial position 20.1 of the slide 20.

The shoulder 24 acts with the pawl 30 like a so-called "directional lock". The locking arm 31 is positioned with its locking end in the movement path 27 of the shoulder 24 illustrated by the dotted line 27 in FIG. 5. Upon insertion movement 59 of FIG. 5, the cam supporting the shoulder 24 moves against the locking arm 31 of the pawl 30 and pushes it away until the shoulder 24 has reached its position illustrated in FIG. 6. Now the locking arm 31 snaps into place in front of the shoulder 24 and secures the slide 20 against the axial spring load 41 in the axial position 20.2. A return movement of the slide 20 into the preceding axial position 20.1 is initially not possible.

The axial position 20.2 of the slide 20 corresponding to the center position 50.2 of the key 50 of FIG. 6 is to be referred to as "working position". In this center position 50.2 an electronic control unit of the device detects first, for example, electrically or electro-magnetically, that the correct key 50 has been inserted. The identification means in the present case is a transponder 43 integrated into the housing 10 which is a component of the electric control device, not illustrated in detail in this context. When it has been determined that the key 50 matches the device, the control unit activates its electrical outputs and/or inputs. A locking function of the vehicle steering mechanism, which has been possibly active up to this point, is released. Primarily, sensors 44 are activated which belong to an actuator 35 which in this case is manually operated. By means of these sensors 44 the desired different functions of the vehicle are selected.

Figure 8:
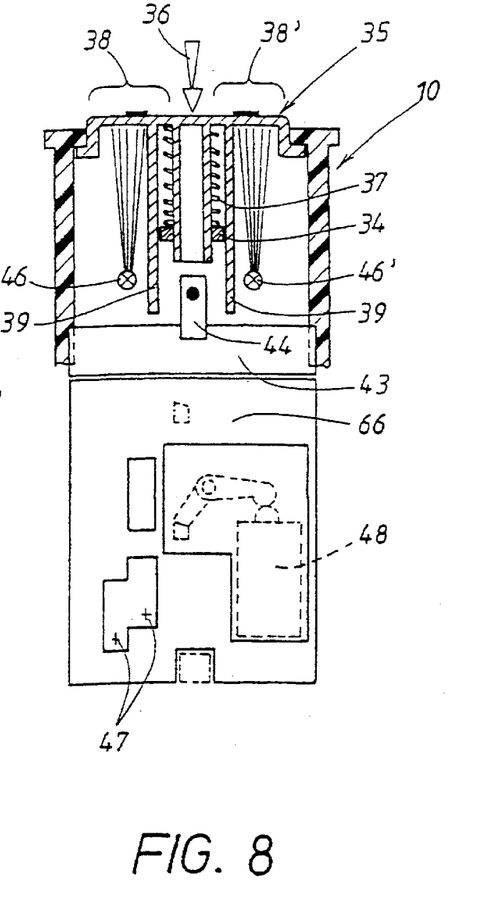
FIG. 8 a front view of a printed circuit board provided within the housing of the device, partially in the mounted state in the housing.

The actuator 35 is comprised in the present case of a pushbutton which, as can be seen in FIGS. 2 and 8, may be integrated into the neighboring area of the same housing 10. The pushbutton 35, as a result of an axial guide 34, can be axially actuated in the direction of the pressure arrow 36 of FIG. 8, and is returned by means of a restoring spring 37 and corresponding end stops into its initial position of FIG. 2. Which actuations result in which functions within the vehicle depends on programming of the electric control unit. One possibility resides in that for a first pushing action 36 of the pushbutton 35 a radio as well as an electronic device in the vehicle are switched on, for example, the parking light, the drive for the window opener, the motor-driven seat adjustment, and the sliding roof. Also, other generally conventional control members in the vehicle can be part of the functional control of the electronic device, for example, the foot brake. The aforementioned radio adjustment is carried out in this case without actuation of the foot brake. The further functions of the vehicle can be triggered in the following way.

As a result of a second pushing action 36 of the pushbutton 35, without simultaneous actuation of the foot brake, the ignition of the motor is carried out, for example. When the pushbutton 35 is pushed 36 and at the same time the foot brake is activated, the engine is started. When the pushbutton 35 is pushed again 36, the motor is turned off. The latter action can be performed with or without actuation of the foot brake.

These functions can also be indicated optically in the area of the sensor 35, as can be seen best with the aid of FIG. 8. By means of the electronic control device, for the function "start" a first diode 46 is activated which illuminates a part of a field 38 with lettering of the pushbutton 35 according to FIG. 4. Light partitions 39 ensure that a partial illumination at the visible side of the pushbutton 35 is possible. When the function "stop" is present, the control unit, on the other hand, supplies a second diode 46' with current so that in the neighboring field 38' with lettering the illumination is switched on and the inscription at the exposed side of the pushbutton 35 can be read.

Figure 7:
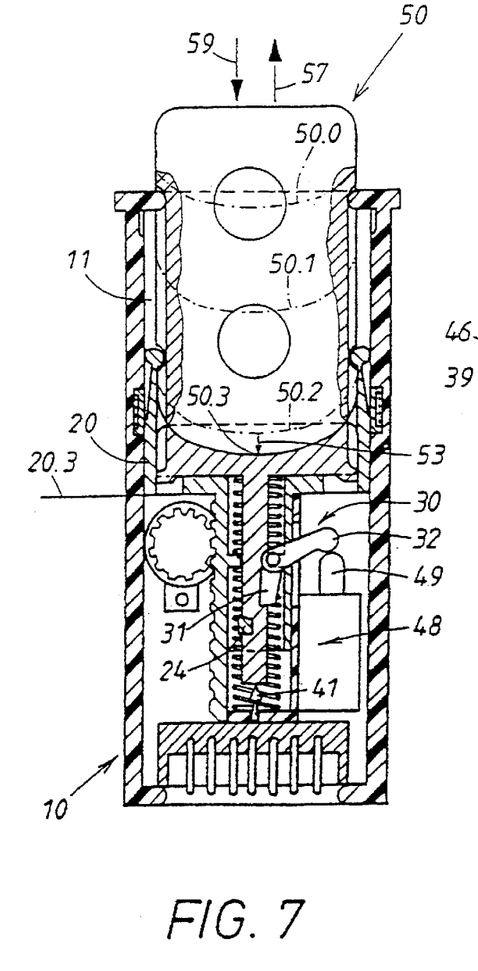
FIG. 7 a stroke position of the inserted key even deeper than that of FIG. 6 in order to move the key from the second stroke position of FIG. 6 into the first stroke position explained in connection with FIG. 5.

Locking of the key 50 in the center position 50.2 is carried out, as disclosed above, by the locking arm 31 of the pawl 30 which, by means of the shoulder 24, also secures the slide 20 in its corresponding working position 20.2. The pawl 30, as a result of a torsion spring load, not illustrated in detail, and the corresponding rotational stops, is normally in its locking position of FIG. 6. The key 50 is primarily arranged in the receptacle 11 so as to be immersed and projects only with a minimal end piece 56 from the receptacle 11 according to FIG. 6. In order to be able to release the key 50 from the center position 50.2, the key 50 must first be pushed into a deeper stroke position 50.3 according to FIG. 7 in the direction of the shown insertion arrow 59. This stroke position 50.3 is named for short "end position". In FIG. 7 the preceding stroke positions 50.0 to 50.2 are also indicated in dash-dotted lines.

For the transition from FIG. 6 to FIG. 7, the key 50 is pushed only by a relatively small third travel stroke 53 according to FIG. 7 against the axial spring force 41. The key then reaches its lowermost third stroke position 50.3 which, of course, corresponds also to a matching end position 20.3 of the slide 20. This end position 20.3 is detected by a further sensor 47 which belongs to the control unit according to the invention. In the response situation, the control unit switches on a drive 48 which is comprised of an electric lifting magnet in this embodiment. This lifting magnet 48 moves a plunger 49 or the like into a working position in which it impacts on the aforementioned control arm 32 of the pawl 30. Because the control arm 32 is fixedly connected to the locking arm 31, this pivot movement according to FIG. 7 moves the locking arm 31 away from its current locking position. The shoulder 24 is released. The blocking of the slide 20 is thus canceled. As a result of the spring force 41 acting thereon, the slide 20 is automatically returned in the direction of movement arrow 57 of FIG. 7. The locking arm 31 remains in its release position of FIG. 7 as a result of the action of the lifting magnet 48 until the shoulder 24 moveable together with the slide 20 has passed its locking end, i.e., up to a point shortly after the center position 50.2 of the key illustrated in FIG. 6.

After the release according to FIG. 7, the axial spring force 41 moves the slide 20 and with it the key 50 until the conditions of FIG. 5 result again. The slide 20 stops first in its initial position 20.1 illustrated therein where the spring force 41 is received by the aforementioned end stop 42 for the slide 20. The key 50 however is still located in its receptacle 11. However, the key 50 now projects with a larger partial piece 28 from the receptacle 11. It can be easily gripped by hand and can be completely pulled out manually in the direction of arrow 57. In the initial position 50.1 of FIG. 5, the described non-positive securing action of the key 50 in the slide 20 is again present.

If a sudden return movement of the slide 20 from the end position into the initial position 20.1 of FIG. 5 occurred, the key 50 could be subjected to acceleration forces which would catapult it out of the receptacle 11, past its non-positive initial position 50.1 of FIG. 5. This can be prevented easily by a suitable damping device 60. It is comprised in the present case of a damping wheel 60 which is stationarily but rotatably supported in the housing 10 at 61, as shown in FIGS. 1 and 2. The damping wheel 60 is in tooth engagement via a spur gear 62 with a toothed rack 63 which is moveable together with the slide 50. The toothed rack 63 can be integrated into the aforementioned axial projection 25 according to FIGS. 1 and 2, where also the cam for the shoulder 24 is located. Inasmuch as the sensor 47 is in the form of a microswitch, the corresponding switching cam 64 can be seated on this projection 25.

Figure 3:
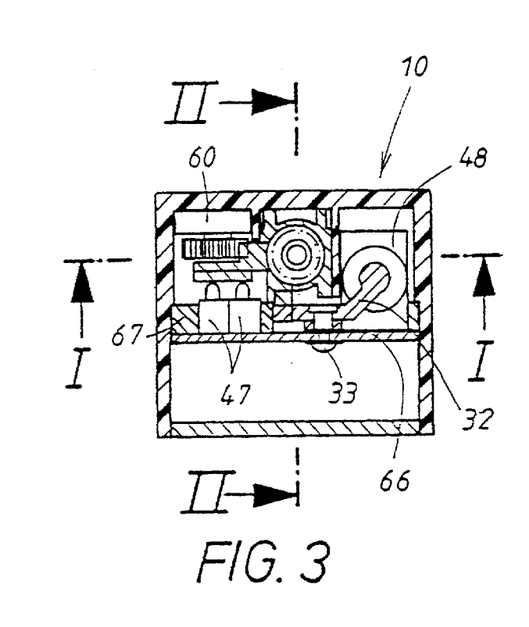
FIG. 3 a cross-section of the device, along the section line indicated in FIG. 1 at III—III.

The aforementioned control unit is connected by means of plug-in contacts 65 provided on the lower housing end with the electrical components in the interior of the housing 10. For this purpose, a printed circuit board 66, illustrated also in FIG. 8, can be used which, by means of suitable intermediate bottoms 67, can be secured in its position in the interior of the housing according to FIG. 3.

As has been mentioned before, the key 50 is released from its positive-locking engagement in FIG. 6 via FIG. 7 in an electro-mechanical way and is returned automatically into its initial position 50.1 of FIG. 5. The prerequisite for this, which is monitored by the aforementioned electric control unit, is that the motor of the vehicle is turned off. When, with the motor turned on, the key 50 in the center position 50.2 is pushed in, the described lifting magnet 48 is not activated; the pawl 30 remains active in the locking sense and catches the key again in the center position 50.2 of FIG. 6. Accordingly, an erroneous operation of the device according to the invention is prevented.

An alternative can however be provided in that, for the vehicle at rest where the wheels no longer turn, the motor is still running. This is also registered by the electric control unit. When, in the sense of FIG. 7, the key 50 is again pushed in, the motor can be switched off by means of an impulse circuit breaker. The described positive-locking connection of the key 50 is then again released electro-mechanically and can be removed manually via the non-positive catch from the initial position 50.1 in FIG. 5.

As has been mentioned before, FIGS. 9 through 14 show the configuration and operation of a second embodiment of the device according to the invention which has its independent inventive importance. For naming analog components the same reference numerals as in the first embodiment are used so that in this respect the above description applies. It is sufficient to point out only the differences. In this device, the key 50 has the form of a check card.

Figure 10:
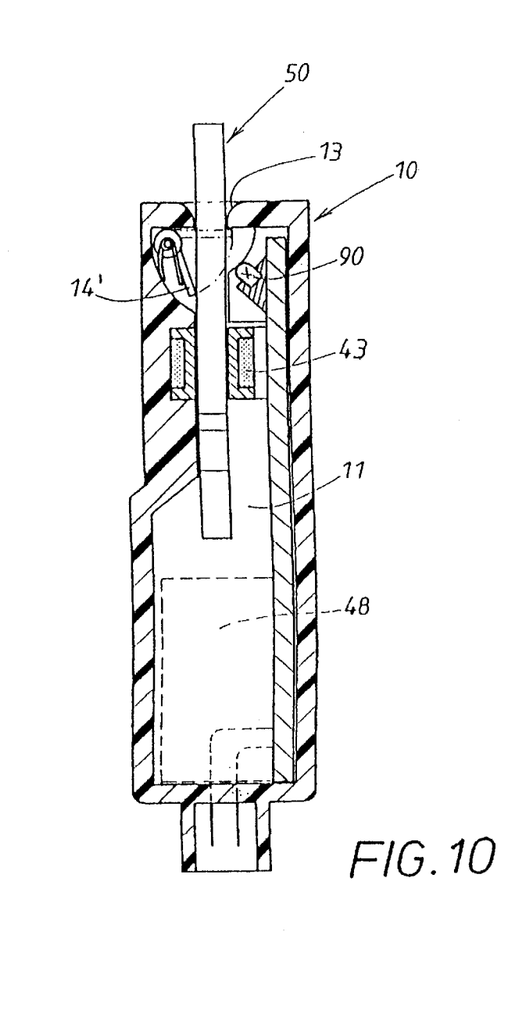
FIG. 10 the second device according to the invention illustrated in FIG. 9 in the same position of the components but in an axial section of the device staggered relative to FIG. 9 at a right angle.
Figure 11:
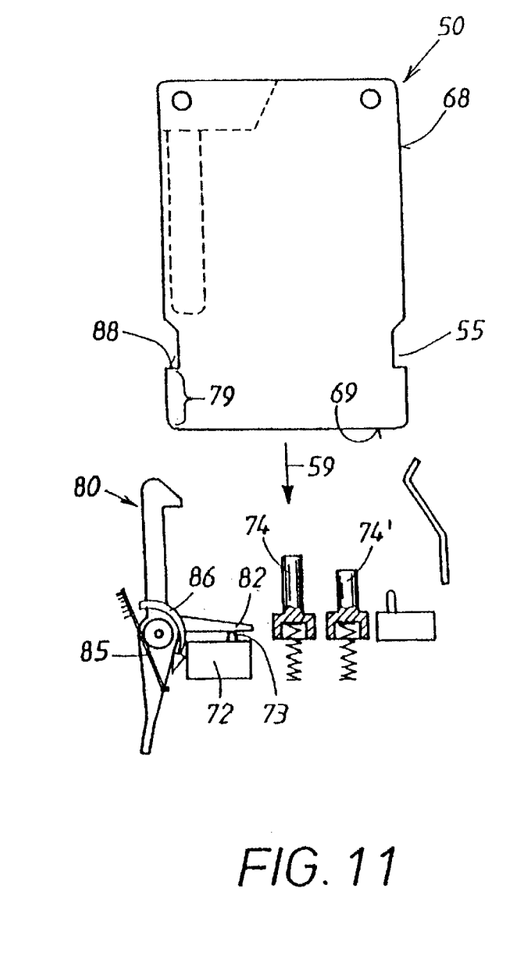
FIG. 11 only a few components of the device illustrated in FIG. 9 in an initial position which results when the key is removed from the device.

The opening 13 at the end face of the receptacle 11 provided here is comprised of a slot in the housing 10. The cover 14' of the opening 13 is in the form of a flap whose open position is illustrated in FIG. 10 in solid lines and whose closed position with removed key is illustrated in FIG. 10 in a dash-dotted lines. Identification means for the key 50 are integrated in the housing 10 and are comprised also in the present case, for example, of a transponder 43. A slide 20, as provided in the first embodiment, is not present. The holding means and locking means interact directly with the key 50 whose check card contour 68, as illustrated best in FIG. 11, is profiled in a suitable way. In this case also, the key 50 can be transferred and positioned within the receptacle 11 in three stroke positions 50.1, 50.2, and 50.3. These three stroke positions are illustrated in FIG. 9 by horizontal lines and are illustrated together with the cooperating components in FIGS. 12 to 14.

Figure 12:
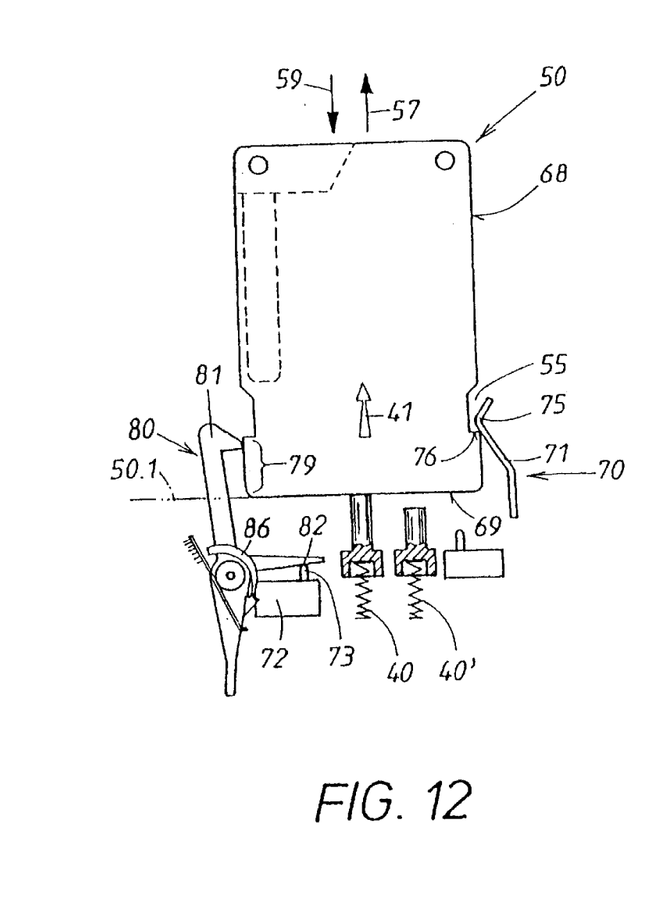
FIGS. 12–14 in an illustration corresponding to FIG. 11, the position of the components when the key is in the three different stroke positions, in analogy to the key positions of the first embodiment illustrated in FIGS. 5, 6, and 7.

Upon insertion 59 of the key 51 first the initial position 50.1 of the key 50, illustrated in FIG. 12, is reached where the key 50 is non-positively secured in the housing 10 by a snap-in lock 70. In this case also, the securing element 71 is comprised of a radial springy tongue but, in contrast to the first embodiment, it is stationarily positioned within the interior of the housing. The snap-in lock 70 also includes a catch recess 55 in the key 50 which is generated by a corresponding edge profile of its aforementioned edge contour 68. A radial projection 75 on the tongue 71 engages from below non-positively a securing edge 76 on the catch recess 55.

Figure 9:
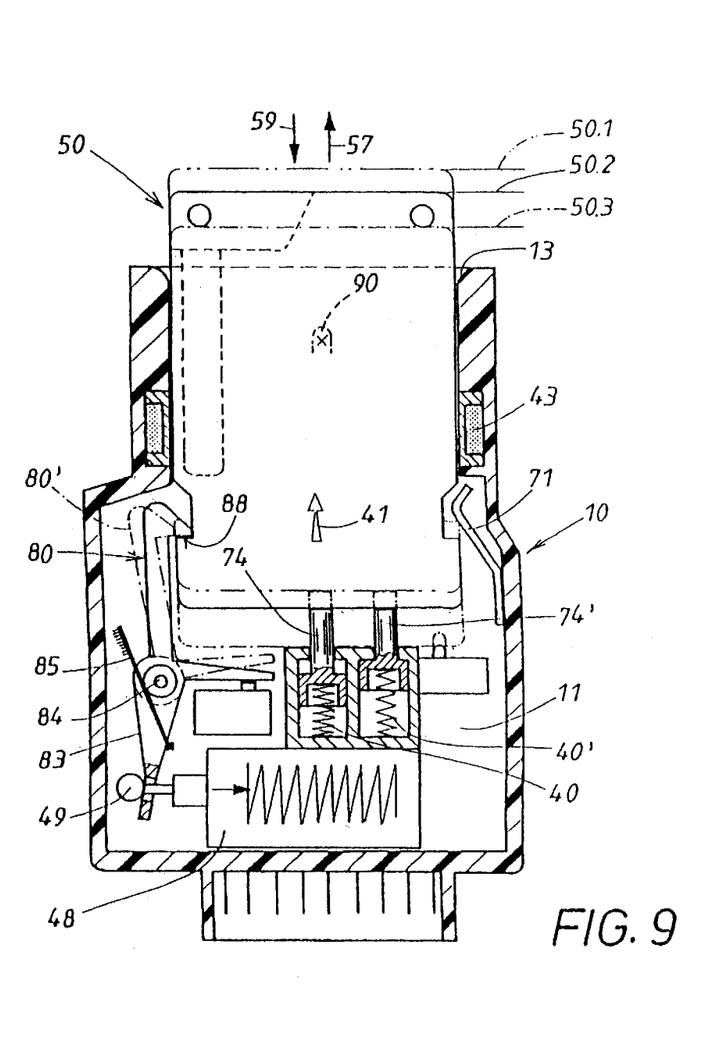
FIG. 9 in analogy to FIG. 6, a corresponding axial section of the second embodiment of the device according to the invention when the key is in its second stroke position.

Because in this case, as mentioned, a slide is not present, the return forces 41 indicated in FIG. 9 act directly on the key 50. Playing a decisive role for this purpose are the doubly provided restoring springs 40, 40' which can press via a corresponding plunger 74 and 74' on the lower edge 69 of the key contour 68. In FIG. 12 one of the plungers 74 is exactly in edge contact and exerts only a minimal restoring force 41. The non-positive securing force of the springy tongue 71 is in any case sufficient in order to ensure the initial position 50.1 of the key 50 of FIG. 12. A removal 57 of the key is possible against the action of the snap-in lock 70 in FIG. 12.

Figure 13:
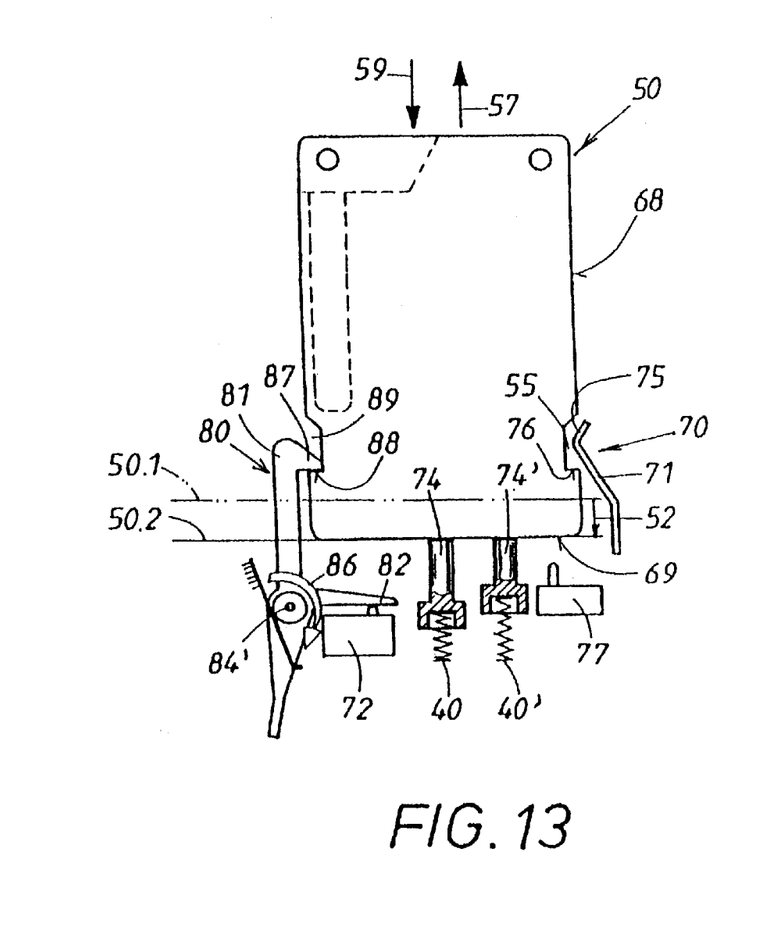

In this second embodiment the key 50 can also be moved 59 from the initial position 50.1 by a travel stroke 52 into the second center position 50.2 in the receptacle 11 of the device, as illustrated in FIG. 13. In this case also, a positive locking connection results in the center position 50.2. The securing elements 81 provided for this are, in contrast to the first embodiment, not a component of the snap-in lock 70 but belong to a separate lock 80 which fulfills several functions. This lock is comprised in the present case of a pawl 80 which is pivotably supported on a stationary bearing 84 in the housing 10. A pawl spring load 85 has the tendency to secure the pawl 80 in its position illustrated in FIG. 11 where it acts by means of its control arm 82 on the actuator 73 of the sensor 72 formed as a microswitch. This is the case already for the key being removed according to FIG. 11. This control arm 82 is fixedly connected with the afore described securing element 81 of this locking device 80.

In the initial position 50.1 of the inserted key 50 illustrated in FIG. 12, the securing element 81 of the pawl 80 comes into contact with the profiled area 79 of the circumferential contour 68 by which the pawl 80 is returned against its restoring force 86. Accordingly, the actuator 73 of the pawl sensor 72 is released by the control arm 82. This is recognized by an electrical control unit provided in this device to which this pawl sensor 72 is connected. The aforementioned transponder 43 is activated and detects whether the "correct key" is adjusted. Only for the correct key, the first functions in the vehicle are already switched on by the control unit, for example, the current supply for a radio, for the parking light, for a drive of the window opener, a motor-driven seat adjustment, and a sliding roof.

Upon pushing 52 the key 50 farther into the aforementioned center position 50.2 of FIG. 13, a positive-locking connection is realized in that the securing element 81 has a hook end 87 which engages behind a shoulder 88 of the key 50. In this way, a removal of the key in the direction of arrow 57 is blocked. By carrying out the movement 52 of the key 50 from FIG. 12 to FIG. 13, stroke work against the restoring force 51 exerted by the restoring spring 40 has been carried out. However, in FIG. 13 the other restoring spring 40' will come to rest with its plunger 74'0 against the lower edge 69 of the key profile 68. The shoulder 88 belongs to an edge cutout 89 of the check card contour 68. As a result of its return pivot force 86 the pawl 80 is thus again in the initial pivot position, already described in FIG. 11, where its control arm 82 pushes on the actuator 73 of the pawl sensor 72. In this center position 50.2 of the key the corresponding electric control unit switches on the ignition of the engine in the vehicle.

In the center position 50.2 of FIG. 13 the non-positive securing action of the lock 70 is no longer important. A radial projection 75 provided on the springy tongue 71 engages still the aforementioned catch recess 55 of the key 50, but this projection 75, in contrast to FIG. 12, is positioned at a spacing from the securing edge 76 providing the non-positive connection of FIG. 12.

Figure 14:
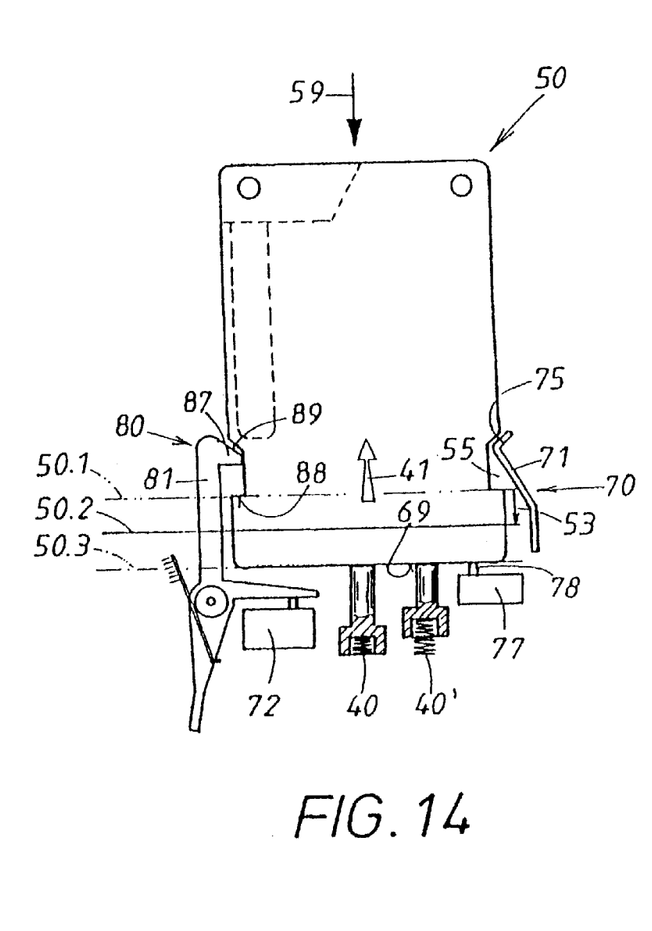

Based on FIG. 13, the key 50 can be transferred by a further travel stroke 53 into the end position 50.3 illustrated in FIG. 14. This requires a higher force because the insertion 59 is counteracted not only by the aforementioned restoring spring 40 but also by the second restoring spring 40'. The end position 50.3 is determined by a further sensor 77. It is comprised in the present case also of a microswitch whose actuator 78 is pushed on by the lower edge 69 of the key profile. This key sensor 77 is, of course, also connected to the electrical control unit. At the same time, the control unit in FIG. 14 determines the pressed state of the pawl sensor 72. As a result of its programming, the control unit turns on the starter of the motor. The engine is started. This can be realized in a time-controlled fashion. As a further prerequisite, the electrical control can monitor the pedal actuation of a foot brake. In this way, an accidental start of the engine can be prevented when the foot brake is not suppressed. Moreover, in the present case the end position 50.3 of the key is reached only in a pulsed fashion, as can be taken from the following condition in FIG. 14.

The afore described securing arm 81 of the pawl 80 can axially move with its hook end 87 away from the shoulder 88, which effects locking, within the correspondingly broad edge cutout 89 of the key. Despite the engagement of the pawl 80 in the edge cutout 89, this locking action 80 of FIG. 13 is a "directional lock" which prevents the removal 57 of the key 50 from the center position 50.2 of FIG. 13 but allows a deeper insertion 59 of the key into the end position 50.3. This is a similar action as had to be provided by separate means 30, 31, 24 in the first embodiment. In this second embodiment, the securing means 81, 88, 89 of the positive-locking lock device 80 take over simultaneously the function of this "directional lock".

The afore described further downward stroke 59 of the key is also not impaired by the elements of the snap-in lock 70. As illustrated in FIG. 14, the size of the catch recess 55 allows a corresponding undisturbed movement of the radial projection 75 on the corresponding springy tongue 71. The free space at 89 in the area of the pawl 80, on the one hand, and at 55 in the area of the snap-in lock 70, on the other hand, makes possible that the restoring force 41 exerted by the restoring springs 40, 40' returns the key 50 from the position in FIG. 14 again into the center position 50.2 of FIG. 13. This is so because the center position 50.2 is secured by the securing element 81 of the pawl 80 which acts as a "locking arm"; the hook end 87 engages again from behind the shoulder 88 of the key 50. Now the position "ignition" of the motor as already described in connection with FIG. 13, is present again. The motor which has been started according to FIG. 14 continues to run in FIG. 13.

In order to turn off the motor, starting from the center position 50.2 of the key 50 in FIG. 13, the key 50 must only be pressed again, a second time, into its end position of FIG. 14. In this connection, it is not important whether the foot brake is also suppressed or not suppressed. Instead, the electrical control can sense via a sensor the brake contact or the wheel rotation of the vehicle. The electrical control unit however also switches a drive 48 according to FIG. 9 which acts on the pawl 80. It is comprised in this second embodiment also of a lifting magnet 48 which acts via a plunger 49 on a release arm 83 which is fixedly connected with the pawl 80. The pawl 80 is transferred into the release position 80' illustrated in dashed lines in FIG. 9. Now the shoulder 88 is released. Because the restoring spring 40 exerts a restoring force 41, it moves the key 50 from the center position 50.2 of FIG. 13 or 9 again into the initial position 50.1 of FIG. 12. Now the positive locking engagement is canceled. According to FIG. 12, the locking device 80 is unlocked by the described profile area 79. Accordingly, only the non-positive connection of the snap-in lock 70 is present. The manual removal 57 of the key 50 is possible again without problems in FIG. 12. The actuator 73 is again in the unsuppressed state at the pawl sensor 72.

Starting from the initial position 50.1 of the key 50 in FIG. 12, the key 50, of course, can also be moved alternatively by a renewed two-step pushing action 59, via the center position 50.2 of FIG. 13 in which the ignition is switched on by the control unit, into the end position 50.3 according to FIG. 14 in which the motor is started. An erroneous operation is impossible.

In this second embodiment the lifting magnet 48 cooperating with the pawl 80 can be used also in order to remove a "wrong key" from the device. Initially, the securing position 50.1 of FIG. 12 and possibly also the end position 50.2 of FIG. 13 can be reached with the wrong key. However, at the latest at this point in time, the transponder 43, or the like, identifies the "wrong key". Subsequently, the electrical control unit switches on the lifting magnet 48 which, via the plunger 49, moves the pawl 80 into its described release position 80'. The restoring force 41 exerted by the restoring spring 40 forces the wrong key into the initial position 50.1 of FIG. 12. The motor cannot be started with the wrong key.

Inasmuch as the vehicle is provided with an "automatic transmission", the selector shaft must be moved into the position "B" or the position "N" (both idling positions) for removing the key 57 in the initial position 50.1 of FIG. 12. Moreover, in this device, as in the first embodiment, an electrical steering column lock is provided which, when the key is removed, results in a locking of the steering wheel. When the correct key, which is detected by the transponder 43, is received in the receptacle 11, the steering wheel lock is then deactivated. Moreover, a sensor in the area of the receptacle 11 is provided, not shown in detail, which, in both embodiments, prevents a locking of the steering wheel as long as the key 50 is in one of its three stroke positions 50.1, 50.2, or 50.3. Only when the key 57 has been removed completely from the housing 10, the steering column lock is activated. Also, in all driving positions of an automatic transmission an ejection movement of the key 50 in the center position 50.2 is not triggered and the steering column lock is not transferred into the locking position. In this way, erroneous operation can be easily prevented.

In the housing an illumination 90 may be provided, as illustrated in FIGS. 9 and 10, which, when opening the door, is activated for a certain amount of time. In this way, the insertion slot 13 is illuminated and facilitates the insertion of the card 50.

List of Reference Numerals 10 housing
11 receptacle
12 contour of the instrument
13 opening of 11 at the end face
14 cover of 11
14' cover flap (FIG. 10)
14.1 ejection position of 14 (FIGS. 1, 2)
14.2 insertion position of 14 (FIGS. 6 through 7)
15 cover pressure spring for 14
16 radial cutout of 10 for 23
17 cover for 13
18 axial guide means at 17, stay
19 radial support surface for 23 on 10
20 slide
20.1 first axial position of 20, initial position (FIGS. 1 through 5)
20.2 second axial position of 20, working position (FIG. 6)
20.3 third axial position of 20, end position (FIG. 7)
21 securing element for 50, springy tongue
22 first end stop for 14, securing element for 50, springy projection
23 counter projection on 21
24 shoulder for 31, cam (directional lock)
25 axial projection of 20
26 inner collar in 25 for 40
27 dotted line, movement path of 24
28 projecting partial member of 50 (FIG. 5)
29 second end stop of 14 (FIG. 5)
30 latch, pawl (directional lock)
31 locking arm of 30 (directional lock)
32 release arm of 30
33 pivot bearing of 30
34 axial guide for 35 (FIG. 8)
35 actuator, pushbutton
36 pressure actuation arrow for pushbutton actuation of 35 (FIG. 8)
37 restoring spring for 35
38 part of field with lettering of 35 for 46
38 ' remainder of field with lettering of 35 for 46'
39 light partition on 35 (FIG. 8)
40 'restoring spring for 20 (FIGS. 1 through 8) or for 50 (FIGS. 9 through 14)
40 further restoring spring for 50 (FIGS. 9 to 14)
41 arrow of the axial restoring force on 20 or 50, axial spring load
42 end stop on 10 for 20 (FIG. 5)
43 transponder for electronic control unit
44 sensor for 35 (FIGS. 2, 8)
45 housing sleeve for 25
46 diode for "start" in 35 (FIG. 8)
46 diode for "stop" in 35 (FIG. 8)
47 sensor for 50.3
48 drive, lifting magnet
49 plunger of 48
50 electronic key
50.0 contact position of 50 (FIGS. 1, 2)
50.1 first axial stroke position of 50, initial position (FIG. 5)
50.2 second axial stroke position of 50, center position (FIG. 6)
50.3 third axial stroke position of 50, end position (FIG. 7)
51 first travel stroke of 50 (FIG. 5)
52 second travel stroke of 50 (FIG. 6)
53 third travel stroke of 50 (FIG. 7)
54 axial guide means of 50, longitudinal groove
55 holding element, catch recess
56 projecting end piece of 50 in 50.2 (FIG. 6)
57 arrow of return stroke, removal movement of 50 from 11
58 front piece of 50
59 arrow of insertion movement of 50 in 11
60 damping device for 20, damping wheel
61 rotational axis of 60
62 spur gear of 60
63 tooth rack of 62
64 switching cam for 47 (FIG. 2)
65 plug-in contact on 10
66 printed circuit board
67 intermediate bottom (FIG. 3)
68 card contour of 50 (FIG. 11), key profile
69 lower edge of 50
70 non-positive snap-in lock
71 securing element of 70, springy tongue
72 pawl sensor
73 actuator of 72
74 plunger for 40
74' plunger for 40'
75 springy projection on 71
76 securing edge of 55 for 50 (FIG. 12)
77 key sensor
78 actuator of 77
79 profile area of 68 for support on 81
80 directional lock, pawl (locking position)
80' unlocking position of 80
81 securing element of 80, locking arm
82 control arm of 80
83 release arm of 80
84 pivot bearing for 80
85 pawl spring load
86 return pivot force on 80 by 85
87 hook end of 81
88 shoulder for 87 on 80
89 edge cutout of 68 for 87
90 illumination of 11 (FIG. 10)

What is claimed is:

1. A device for starting a motor of a motor vehicle by means of an electronic key (50), comprising a receptacle (11) in the vehicle serving for insertion (59) of the key (50), wherein the key (50) inserted into the receptacle (11) is non-rotatable and longitudinally slidable (51, 52, 53) at least between three axially staggered positions (50.1, 50.2, 50.3), i.e., during the initial insertion (59), first into an initial position (50.1) which secures the key (50) in the forward area of the receptacle (11) only in a non-positive way, subsequently, into a center position (50.2) in the central area of the receptacle (11) upon further insertion (59) by a first travel stroke (52) in which position the key (50) is secured positive-lockingly, which prevents a manual removal (57) of the key (50) from the receptacle (11), but allows a further insertion (59) of the key (50), and, finally, into an end position (50.3) upon further insertion (59) by a second travel stroke (53) positioning the key (50) in the rearward area of the receptacle (11), wherein the key (50) in its end position (50.3) is axially spring-loaded (41) in the direction of its initial position (50.1) by a restoring spring (40), and upon insertion (59) of the key (50) into the initial position (50.1) a snap-in lock (21, 22; 55; 70) and upon insertion (59) into the center position (50.2) a directional lock (24; 30, 31; 80) interacting with the key (50) are automatically activated, and some of the three key stroke positions (50.1, 50.2, 50.3) are monitored by sensors of a control unit and are used for controlling different functions of the motor, wherein the key (50) in its center position (50.2) is also axially spring-loaded (41) in the direction of its initial position (50.1) by a restoring spring (40); and that the control unit responds to a single or multiple pressing actions (59) of the key (50) between the center position (50.2) into the end position (50.3) and that the directional lock (24; 30, 31; 80) is deactivated until the restoring force (41) has returned (57) the key (50) automatically into the initial position (50.1).

2. The device according to claim 1, wherein the directional lock comprises a latch (30; 80) that is itself spring-loaded (85) and projects into the axial path (27) of a shoulder (24; 88), which can be entrained by the key (50), and engages behind the shoulder (24; 88) in the center position (50.2) of the key (50);

and that the control unit in a control situation moves the latch (30; 80) against the latch spring load (86) out of the axial path of the shoulder (24; 88).

3. The device according to claim 2, wherein the latch is comprised of a pawl (30; 80) wherein the pawl (30; 80) has, in addition to a locking arm (31; 81) cooperating with the shoulder (24; 88), a release arm (32) fixedly connected thereto;

and that the release arm (32; 83) is connected with a drive (48), which is controlled by the electrical control unit.

4. The device according to claim 3, wherein in the receptacle (11) electronic identification means for the key (50) are arranged which are in active connection with the electric control unit, and that the detection of a wrong key (50) results in the drive (48) for the pawl (30; 80) being activated and the latch being released, so that the wrong key (50) is pushed out by the restoring force (41) into its initial position (50.1) in the receptacle (11).

5. The device according to claim 4, wherein the electronic identification means is comprised of a transponder (43).

6. The device according to claim 3, wherein the pawl (80) of the directional lock has a control arm (82) fixedly formed on the locking and release arm (81, 83), and that the control arm (82) acts on a pawl sensor (72).

7. The device according to claim 6, wherein the locking position of the pawl (80) is determined by the pawl spring load (85) that the locking position is present for the removed key (50), i.e., for an empty receptacle (11), as well as for a key (50) in the center position (50.2) and in the end position (50.3), and that the pawl sensor (72) is actuated by the control arm (82) in the locking position of the pawl (80), but, in the initial position (50.1) of the key (50), the pawl (80) is pivoted by a profiled section (79) of the circumferential profile (68) of the key from its locking position against the pawl spring load (86) and releases the pawl sensor (72).

8. The device according to claim 7, wherein the receptacle (11) has, in addition to the pawl sensor (72), a key sensor (77) which is also in connection with the control unit and monitors the end position (50.3) of the key (50).

9. The device according to claim 1, wherein the axial restoring force (41) acting on the key (50) can change in a step-wise manner as a function of its stroke position (50.1, 50.2, 50.3) in the receptacle (11), and that the restoring force (41) in the initial position (50.1) of the key (50) is smaller than in the central position (50.2) and the end position (50.3).

10. The device according to claim 1, wherein a manual or pedal actuator (35) for selecting different functions in the vehicle is active in the center position (50.2) of the key, but is inactive in all other positions (50.0, 50.1, 50.3) of the key (50).

11. The device according to claim 1 with a receptacle (11), whose opening (13) normally is closed (14.1) by a springy (15) cover (14), wherein the cover (14) upon insertion (59) of the key (50) is pushed away against the cover spring load (15);

wherein the cover (14) is a component of a slide (20) axially movable within the housing (10) of the receptacle (11);

that the slide (20) upon insertion (59) receives the forward piece (58) of the key (50) and the slide (20) comprises the securing means (21, 22) that act non-positively as well as the securing means that act positive-lockingly on the key (50), wherein these securing means secure the key (50) in the slide (20);

that the slide (20) can be transferred by the axial movement (59) of the key (50) into different axial positions (20.1, 20.2, 20.3) which determine the different stroke positions (50.1, 50.2, 50.3) of the key (50);

and that the slide (20) is axially spring-loaded (40) and in this way generates the restoring force (41) acting on the inserted key (50);

and that the slide (20) in its central axial position (50.2) determining the center position (50.2) of the key (50) is secured by a springy latch (30) of a directional lock and this directional lock acts indirectly via the slide (20) onto the key (50).

12. The device according to claim 11, wherein the slide (20) in the initial position (50.1) of the inserted key (50) as well as for the removed key is within the same initial position (20.1) in the housing (10) of the receptacle (11), and that the initial position (50.1) is determined by means of the axial spring force (41) acting on the slide (20), on the one hand, and an end stop (42) in the housing (10) of the receptacle (11), on the other hand.

13. The device according to claim 12, wherein the cover (14) for the opening (13) of the receptacle (11), in turn, is axially movable between two positions (14.1, 14.2) in the slide (20), that these two positions (14.1, 14.2) are determined by a forward and a rearward end stop (22, 29) in the slide (20), that the cover spring load (15) has the tendency to push the cover (14) axially against the forward end stop (22), and that the forward end stop (22) and the cover spring load (15) determine the closing ejection position (14.1) of the cover (14) for covering the opening (13) which position results when the key (50) is removed.

14. Device according to claim 13, wherein for the inserted key (50) the cover (14) is positioned in an insertion position (14.2) determined by the rearward end stop (29) on the slide (20);

and that this insertion position (14.2) of the cover (14) is present in all three axial stroke positions of the key (50).

15. The device according to claim 11, wherein the same holding elements (21, 22) which generate the non-positive connection between the key (50) and the slide (20) also participate in the positive-locking connection between the key (50) and the slide (20).

16. The device according to claim 15, wherein the non-positive securing elements (21, 22) positioned on the slide (20) have a springy projection (22);

that the projection (22) has correlated therewith a counter projection (23) on its backside facing the housing (10) of the receptacle (11);

that this counter projection (23) in the initial position (20.1) of the slide (20), characterizing the securing position (50.1) of the key (50), is radially aligned with a cutout (16) in the housing (10) into which contour the counter projection (23) deflects springily when the key (50) is inserted (59);

and that the counter projection has correlated therewith a radial support surface (19) in the housing (10) which radially reinforces the springy member (22) when the slide (20) is moved by the key (50) farther from its initial position (20.1) into axial positions (20.2, 20.3) which are positioned deeper.

17. The device according to claim 11, wherein the axially movable slide (20) is provided with a damping device (60), and that the damping device (60) brakes the spring-caused (40) axial return movement (57) of the key (50) received in the slide (20) from its end position (50.3), via the center position (50.2), to the initial position (50.1).

18. Device according to claim 1, wherein the control unit serving for differentiating the selected functions also responds to actuation or non-actuation of further control members in the vehicle.

19. Device according to claim 1, wherein the control unit serving for differentiating the selected functions responds to a non-actuation of further control members of the vehicle.

20. The device according to claim 1, wherein the actuator serving for the different functions in the motor vehicle comprises a pushbutton (35);

and that the electrical control unit differentiates the number and/or the sequence of different actuations (36) and triggers the selected functions in the motor vehicle accordingly.

* * * * *